Jan. 14, 1941.  H. A. BERLINER  2,228,253
AIRCRAFT CONSTRUCTION
Filed Oct. 24, 1938  5 Sheets-Sheet 1

INVENTOR.
HENRY A. BERLINER
BY
McConkey Dawson Booth
ATTORNEYS.

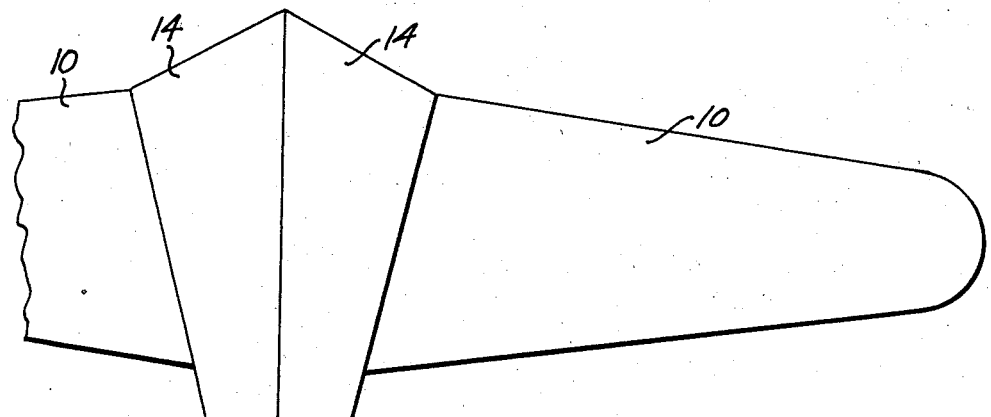
Fig. 6
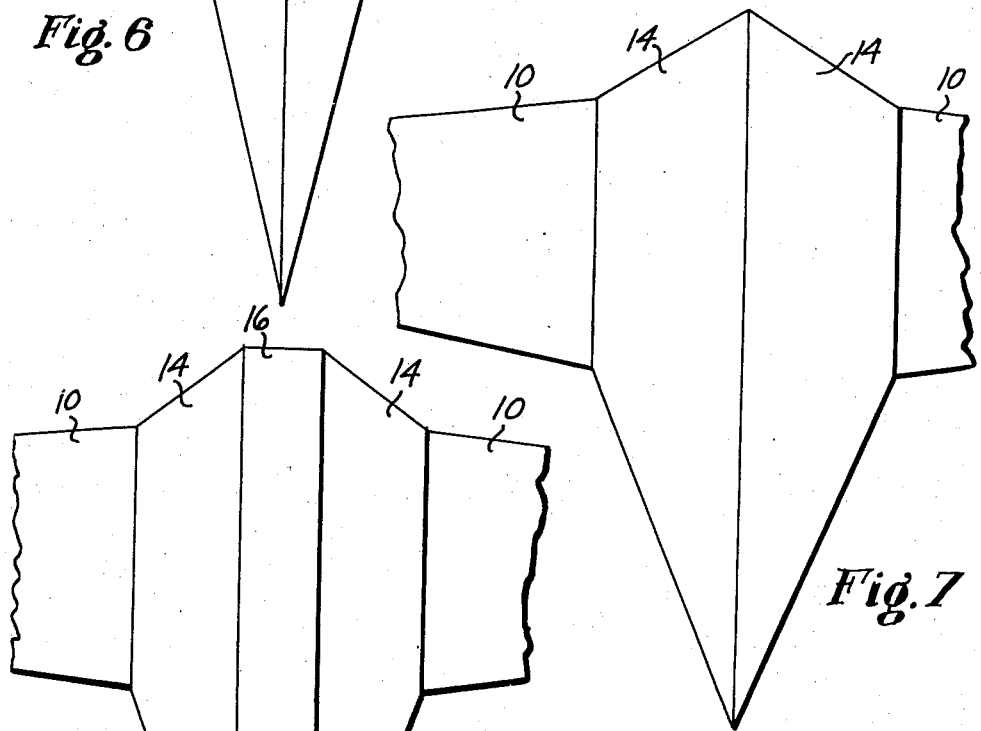
Fig. 7
Fig. 8
INVENTOR.
HENRY A. BERLINER
BY McConkey Dawson & Booth
ATTORNEYS.

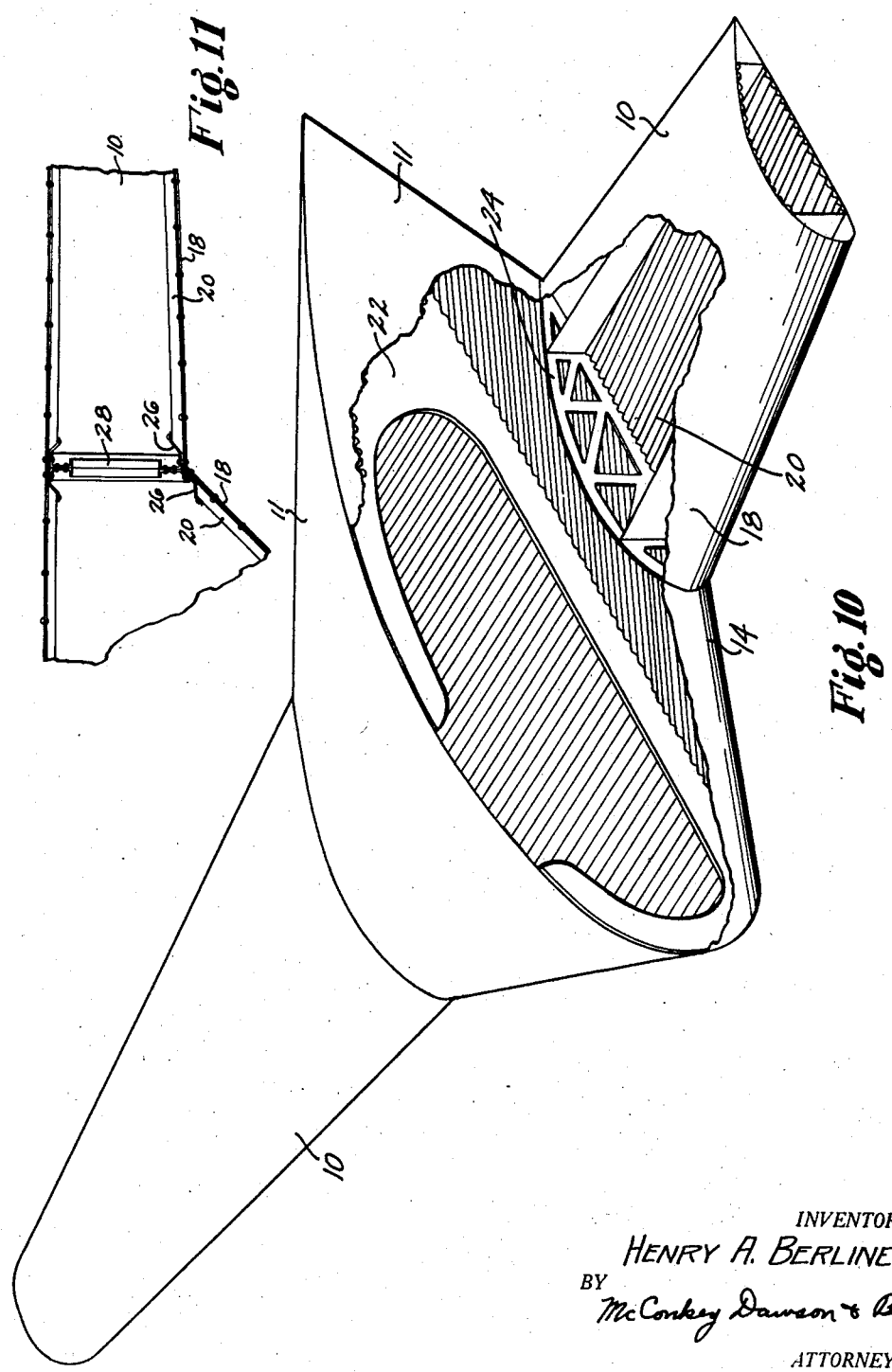

Jan. 14, 1941.　　　H. A. BERLINER　　　2,228,253
AIRCRAFT CONSTRUCTION
Filed Oct. 24, 1938　　　5 Sheets-Sheet 4

INVENTOR.
HENRY A. BERLINER
BY McConkey Dawson & Booth
ATTORNEYS.

Jan. 14, 1941.  H. A. BERLINER  2,228,253
AIRCRAFT CONSTRUCTION
Filed Oct. 24, 1938   5 Sheets-Sheet 5

INVENTOR.
Henry A. Berliner
BY McConkey Dawson & Booth
ATTORNEYS.

Patented Jan. 14, 1941

2,228,253

UNITED STATES PATENT OFFICE 2,228,253

AIRCRAFT CONSTRUCTION

Henry A. Berliner, Washington, D. C., assignor, by mesne assignments, to Engineering and Research Corporation, Riverdale, Md., a corporation of Maryland Application October 24, 1938, Serial No. 236,609

13 Claims. (Cl. 244—117)

This invention relates to aircraft construction and more particularly to a unitary airplane structure in which a major portion of the load is carried by the skin.

In airplanes as heretofore constructed the wings and fuselage have been made as separate units and have been connected together by beams or trusses extending through the fuselage and secured to the load carrying structure of the wings. While the skin covering of the wings has been relied on to some extent in carrying the load very little use has been made of the fuselage skin covering to resist wing bending loads due partly to the lack of strength in the double curved sections and partly to structural difficulties encountered in attempting to carry stresses through the fuselage skin.

Airplanes constructed in the conventional manner further normally present abrupt changes in section spanwise, as for example at the point where the wings join the fuselage, at the sides of the fuselage, etc. These abrupt changes tend to create vortices and inflows resulting in large induced aerodynamic losses.

It is accordingly one of the objects of the invention to provide an aircraft construction in which the skin of the wings and fuselage is connected and serves to carry a major portion of the load.

Another object of the invention is to provide an aircraft construction in which no double curves are employed. This contributes materially to fabrication and enables all skin stresses to be carried by straight sections.

Still another object of the invention is to provide an aircraft construction in which all changes in section are gradual. This avoids the formation of vortices and reduces the aerodynamic drag.

Other objects and advantages of the invention, both structural and aerodynamic, will be apparent from the following description of the accompanying drawings, in which:

Figures 6, 7 and 8 are diagrammatic planforms of aircraft constructions embodying the invention;

Figure 10 is a perspective with parts broken away showing one form of aircraft construction;

Figure 11 is a partial transverse section of Figure 10;

In hollow beam structures carrying bending stresses I have found that much greater strength is obtained if the walls of the beam sections are straight in the direction of transmitted stresses. If the beam is to follow a curved outline it will be stronger if it is made up of several straight sections preferably divided by transverse bulkheads or the like to reinforce it against collapsing. Similar bulkheads at spaced points are also advantageous in long straight sections and serve, in effect to divide the beam into a series of shorter column lengths.

Figure 1:
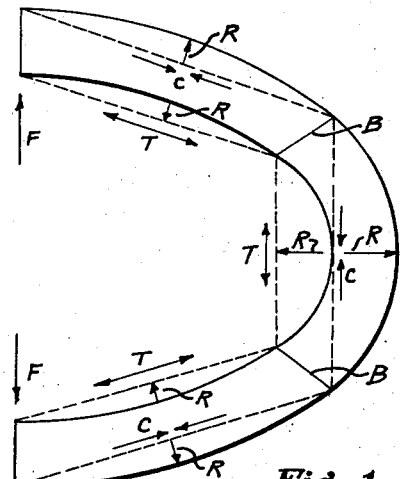
Figures 1 and 2 are force diagrams.
Figure 2:
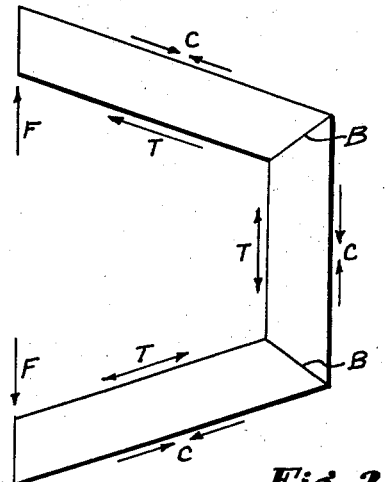

This principle is illustrated in Figures 1 and 2 which show generally U-shaped curved and straight section hollow beams loaded at their ends with bending forces F. In this construction the inner beam wall or skin will be stressed in tension as indicated by T and the outer wall will be stressed in compression as indicated by C. The beams are divided by transverse partitions or bulkheads B into three connected sections.

In the beam of Figure 1 the tension and compression forces act in straight lines between the edges of the bulkheads as indicated by the dotted straight lines. Since these forces lie outside of the walls which must carry them, resultants indicated by R will be created tending to straighten out the inner wall and to bow the outer wall still farther. Therefore, the beam walls must be sufficiently strong not only to carry the tensile and compressive loads but also to resist the lateral resultants.

In Figure 2 the beam walls are straight between the bulkheads and the tensile and compressive stresses follow straight lines lying within the walls which carry them. Therefore, there are no lateral resultants, the walls carrying the stresses as straight beam loads, and beam walls of the same unit strength can carry a much greater load than in the curved construction of Figure 1.

In applying this principle to aircraft I have provided an airplane construction in which the skin of the wing and fuselage portions is connected throughout and in which all wall portions are substantially straight sections in the direction of stress. Single curvature is provided where necessary to give an air foil section but no double curves whatever are used and all of the major stresses are carried in approximately straight lines.

Figure 3:
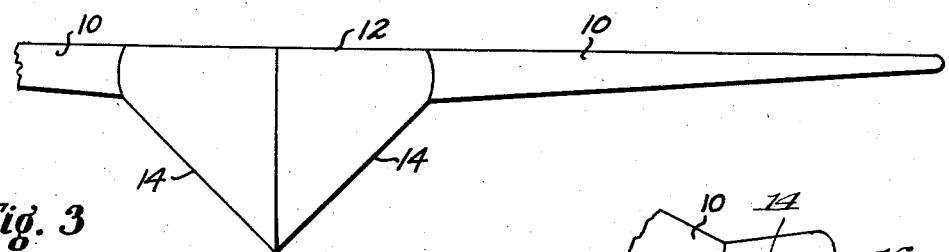
Figures 3, 4 and 5 are diagrammatic front elevations of aircraft constructions embodying the invention.
Figure 4:
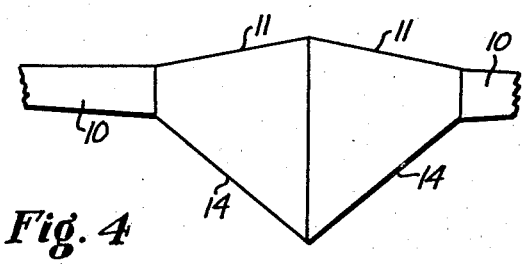
Figure 5:
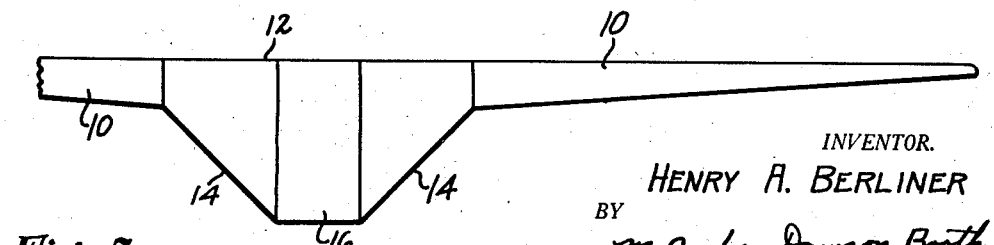

Figures 3 to 5 illustrate several front elevational outlines which may be followed. In Figure 3 the wings 10 are hollow and have straight upper and lower walls transversely of the line of flight. The fuselage section is formed with a flat top 12 connected to the top walls or skin of the wings and with V-shaped bottom walls 14 connected to the bottom wing walls. Suitable bulkheads, not shown, are provided centrally of the fuselage section at the juncture of walls 14, at the point where the wing sections join the fuselage section and at such other places as may be desired.

The skin throughout is preferably formed of flat, smooth sheets reinforced by corrugated sheets, by bulbs, T's or U's or hat sections welded or riveted thereto, or by plastic or wood strips secured thereto. For some purposes it might be desirable to form all or certain portions of the skin structure of relatively thick plywood such as formed with a soft wood core and spruce or birch veneer surfaces. All such structures are capable of carrying relatively heavy column loads and of withstanding high tensions so that a strong and rigid structure is provided with a minimum of weight.

Since the major load in an airplane is along an axis extending from wing tip to wing tip transverse to the line of flight it will be seen that the present invention provides a hollow beam for carrying this load in which all stresses are transmitted in straight lines. Thus a very light strong construction is formed in which full use is made of the load carrying capacity of the skin.

Figure 4 illustrates a slight modification in which the flat top member 12 of Figure 3 is replaced by two plates 11 extending upwardly in a slight V. These members transmit the load stresses in straight lines due to the location of the bulkheads but slightly more cabin room is provided with the form of Figure 4 than with that of Figure 3.

If still more cabin room is desired the construction of Figure 5 may be employed in which a piece 16 is placed between the walls 14. In this structure two central bulkheads are provided, one at each side of the piece 16; or other suitable vertical reinforcements may be provided at opposite sides of the piece 16 to resist collapsing stresses.

The section forms of Figures 3, 4 and 5 may follow any one of several plan forms as indicated in Figures 6, 7 and 8. As shown in Figure 6 the fuselage section is in the general form of a triangle with its base toward the front of the plane. The walls 14 curve over the front to form an airfoil shape and preferably extend slightly forward at the center in the form of a V. The fuselage section tapers back toward the rear in the shape of true airfoil and the wings, of course, are given a proper airfoil section.

The plan form of Figure 7 is similar to that of Figure 6 except that the fuselage section extends back parallel to the line of flight to the rear edge of the wings before it starts to taper in. This provides more cabin space but is otherwise similar to Figure 6.

Figure 8 illustrates a planform suitable for the elevation form of Figure 5 in which the piece 16 is arranged between the walls 14. The structure provides maximum cabin space and is particularly suited to large planes.

Figure 9:
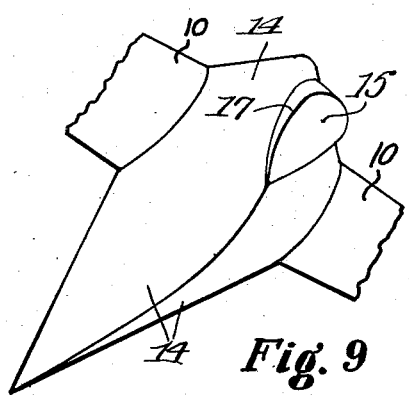
Figure 9 is a perspective showing an alternative construction.

If additional cabin space is desired in any of the forms described above, the fuselage section may be bulged out, as shown for example in Figure 9. In this figure a flat plate 15 is shown inserted at the meeting edge of the sheets 14 and is connected thereto by side plates 17. All of the plates are preferably straight in transverse section and may be shaped to provide a section having low aerodynamic resistance. This arrangement is particularly advantageous in small planes to provide increased foot room but may be used wherever additional cabin space is desired locally.

The structure may be understood in more detail by reference to Figures 10 and 11 which show a plane having the combined forms of Figures 4 and 7. As shown the wing and fuselage sections are formed of smooth outer skins or sheets 18 of aluminum or the like reinforced by corrugated sheets 20 arranged with the corrugations paralleling the stress lines transverse to the line of flight. The sheets 18 and 20 are preferably welded or riveted together to form a unitary structure having high tensile strength and capable of withstanding large column loads in compression. The walls 11 and 14 may be formed of a single sheet for each half of the fuselage section bent into the desired shape and joined by a single seam.

In Figure 10 two bulkheads are illustrated but it will be understood that any number might be employed as desired. A gusset type bulkhead 22 is illustrated at the center of the fuselage section at the juncture of walls 11 and 14. The principal purpose of this bulkhead is to withstand collapsing stresses and since all of the weight in the lower portion of the cabin tends to resist its collapsing, this bulkhead need not be very heavy. A similar bulkhead 24 is provided where the wing and fuselage sections join and other like bulkheads may be provided in the fuselage or wing sections as desired to resist collapsing.

For structural reasons it is desirable to form the wing and fuselage sections separately and to connect them together as units. This may be done as more particularly described and claimed in my prior Patent No. 2,113,716 by providing connecting members 26 extending completely around the ends of the sections to be joined and having mating flanges adapted to be bolted or riveted together. The members 26 are riveted or otherwise secured to the outer sheets 18 and have skirt portions conforming to and secured to the reinforcing sheets 20 so that both sheets of the two sections are securely united.

In some cases it may be possible to utilize the member 26 as a bulkhead by extending the mating flanges and turning them over as indicated at 28 in Figure 11. This provides a rigid structure capable of resisting a large collapsing force. Where a separate bulkhead is used it may, if desired, be connected to the member 26.

Figure 12:
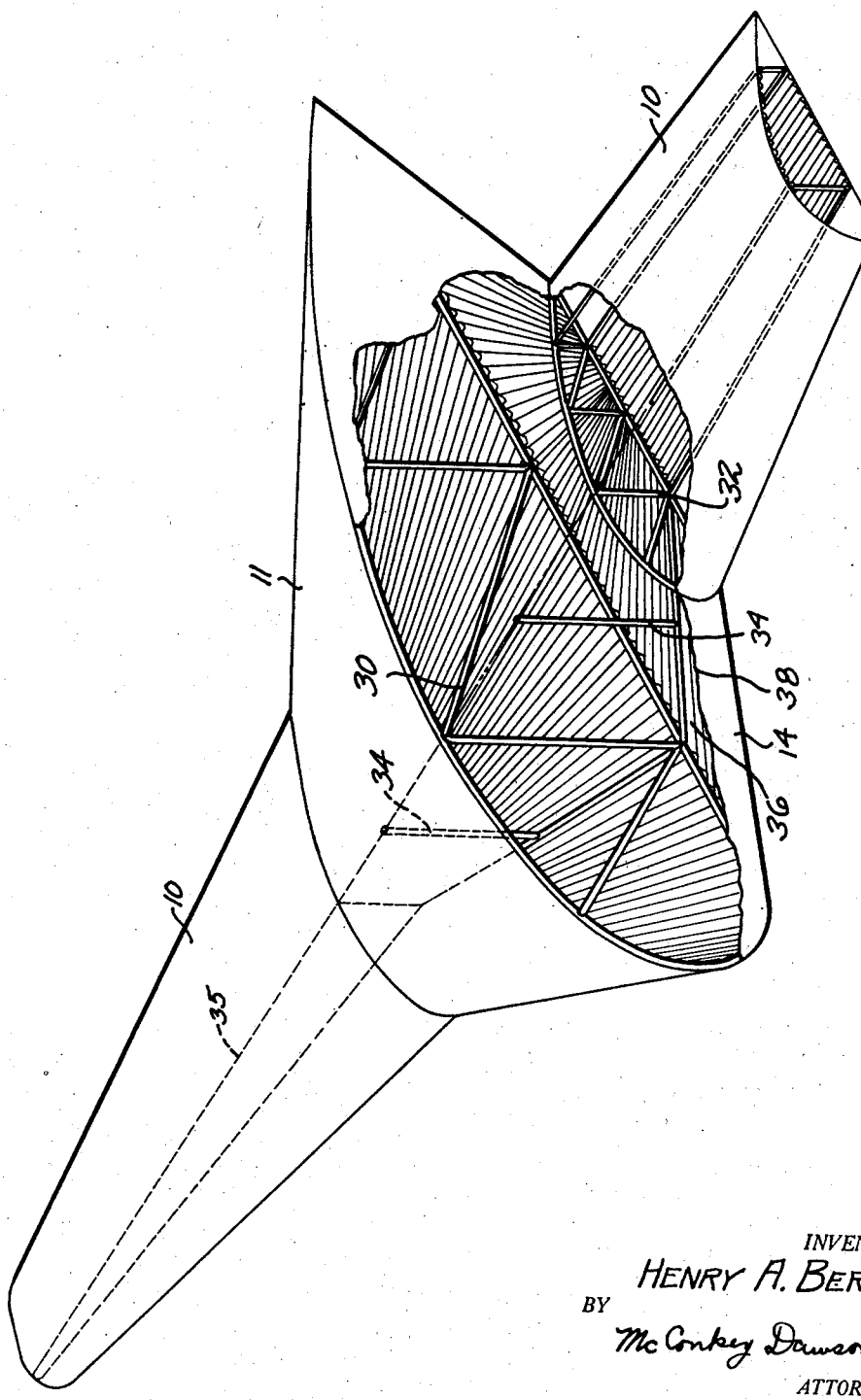
Figure 12 is a view similar to Figure 10 showing a modified construction.

Figure 12 illustrates a modified construction in which the bulkhead 22 of Figure 10 is replaced by a truss type bulkhead 30. A similar truss type bulkhead 32 replaces the bulkhead 24 of Figure 10. As a further reinforcement there are shown in Figure 12 a plurality of ties or rods 34 extending from top to bottom of the fuselage section and serving to divide the fuselage top and bottom skin members into relatively short truss lengths. This figure also illustrates diagrammatically a transverse beam or truss at 35 extending from wing tip to wing tip. While such a beam is ordinarily not necessary it may be used in some cases as an additional reinforcement. Various other forms of bulkheads and reinforcements can be used to suit different cabin accommodations.

In forming the fuselage section of corrugated reinforcing sheets as shown in Figure 10, there is a tendency for the corrugations to curve lengthwise as folding the sheets creates generally conical sections. This may be avoided by folding the flat and corrugated sheets separately before securing them together in which case the corrugations might be compressed where necessary or by using separate reinforcing members separately secured to the outer sheet and radiating from the apices of the conical sections. Such a construction is shown in Figure 12 in which reinforcing strips 36 are secured to the outer sheets 38 and are arranged to radiate from the conical apices so that they always follow straight lines.

An airplane constructed according to the invention enables a large span to be utilized without introducing large structural bending moments due to the fact that the wide deep fuselage section tapering to the wing proper acts as a truss supporting the wing outboard to a comparatively large percentage of the wing span. Comparing this structure with a conventional fuselage wing design shows weight savings upwards of 15% for the wing and fuselage sections.

Further, fabrication is much easier due to the absence of any double curvatures. The present construction can be formed by combining wrapped flat sheets without the necessity for creating complicated special shapes.

Aerodynamically the construction of the present invention is advantageous since its total wetted area is approximately 10% less than a comparable conventional monoplane.

Any vertical section taken parallel or nearly parallel to the line of flight is a true airfoil and there are no abrupt changes in section or thickness. This results in a fuselage-wing combination with a span lift distribution having no abrupt changes which would cause induced aerodynamic losses. Actual wind tunnel tests show a reduction in aerodynamic drag of 13% to 16% over a comparable conventional monoplane at the same total lift.

The present construction lends itself admirably to cabin super charging for flying at high altitude. The stiff skin structure provided to carry the weight load may be made sufficiently strong to take the air pressure load due to supercharging with little or no increase in weight, and reinforcing rods such as 34, Figure 12, may be provided if desired. For this use airtight bulkheads are preferably provided to segregate the cabin space it is desired to supercharge.

While no tail structure at all has been shown it will be understood that any suitable tail group might be provided or that the invention might be embodied in a tailless design. Thus a suitable tail group might be mounted directly on the rear portion of the fuselage section or a suitable boom might be extended from the fuselage section to carry a tail group. One or more engines and propellers may also be mounted as desired either in the fuselage or in the wings. However since the specific arrangements of the engines and tail group per se form no part of the present invention these have not been illustrated.

The sloping lower sides of the fuselage section provide an excellent location for observation windows, providing an unobstructed view of the ground. All window and door openings and other openings for retractable landing gear or the like are preferably formed by suitable frames or reinforcements secured to both layers of the skin to form a stress transmitting continuation thereof. Such frames may be secured to the skin by fastening members similar to those of my Patent No. 2,113,716.

Figure 13:
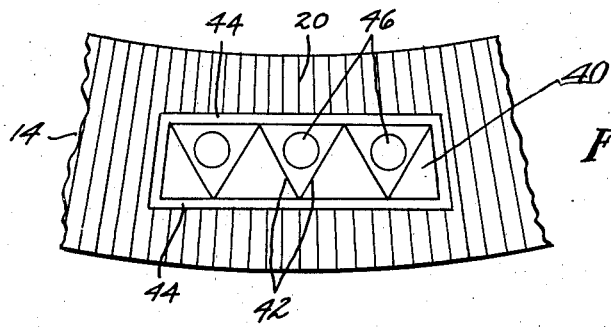
Figure 13 is a view of a wall from the inside showing window mountings.
Figure 13A:
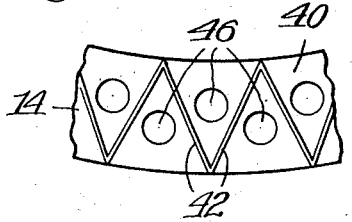
Figure 13a is a modified view similar to Figure 13.

Figure 13 illustrates one such arrangement in which an opening is formed in a side 14 and has secured over it a plate 40 reinforced by strips 42 secured to the surrounding skin by fastening members 44 of the type shown in my Patent No. 2,113,716. Suitable glazed windows 46 are formed in the plate 40. Instead of utilizing a relatively small frame as shown, one or both sides 14 of the fuselage section may be formed of plates reinforced by strips or light beams such as 42 and having window or door openings therein, this amounting practically to an enlargement of the plate 40 as shown in Figure 13a wherein like parts are designated by the same reference numerals as in Figure 13.

Figure 14:
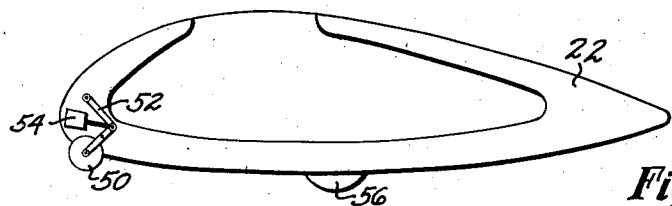
Figure 14 is a central section showing a landing wheel mounting.

The present construction lends itself admirably to the mounting of landing gear of various types, it being especially advantageous with nosewheel type landing gear since the center truss or bulkhead provides economical structural strength for the installation and the fuselage section provides an aerodynamically clean place in the nose to retract the wheel. An installation of this type is illustrated diagrammatically in Figure 14 in connection with a structure like that of Figure 10, showing a nosewheel 50 mounted on a retractable linkage 52 connected to the bulkhead 22 and controlled by suitable mechanism indicated at 54. The wheel 50 may be arranged at one side of the bulkhead or the bulkhead may be cut out or otherwise shaped to receive it and a suitable reinforced opening may be made in the skin for passage of the wheel and for retracting mechanism. The main wheels for a gear of this type indicated at 56 are preferably retractable into the sides of the fuselage section and may be carried by supplemental bulkheads or reinforcing members, not shown.

Figure 15:
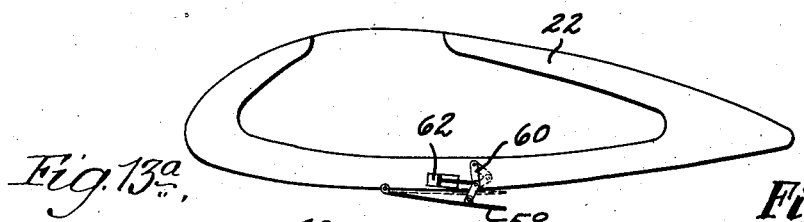
Figure 15 is a central longitudinal section showing a step mounting.

For landing on water as in a flying boat or amphibian type of plane, the fuselage section may be provided with a step. The step may be fixedly connected to the center bulkhead but is preferably hinged thereto as shown in Figure 15 so that it can be retracted to reduce wind resistance. In this construction a step member 58 preferably V-shaped in section to fit the fuselage is pivoted at its forward end to the lower part of the fuselage section so that its load is carried by the center bulkhead 22. A linkage 60 controlled by a suitable fluid motor or the like 62 serves to raise and lower the step 58 as desired. With this arrangement suitable retractable pontoons or the like may be mounted on the wings.

Figure 16:
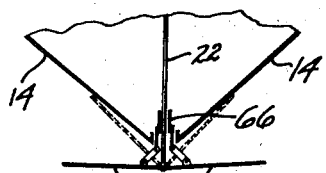
Figure 16 is a transverse section showing a modified step construction.

In addition to or in place of pivoting the step as shown in Figure 15 it may also be hinged longitudinally as shown in Figure 16. In this figure the step is formed of two plates 64 hinged together and to the bulkhead 22 or a suitable extension thereof longitudinally of the fuselage section. The step may be controlled by a rod 66 slidably mounted in a cut-out slot in the bulkhead 22 and linked to the plates 64 to raise and lower them. This construction provides a relatively flat step giving advantageous takeoff on the water yet which can be retracted to reduce air resistance in flight.

Figure 17:
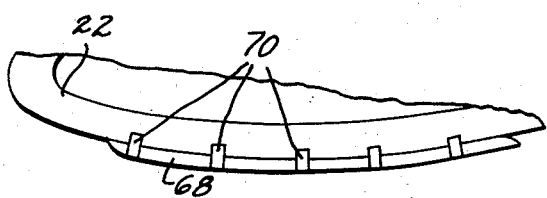
Figure 17 is a central section showing a ski mounting.

Figure 17 illustrates a construction adapted for landing on ice or snow in which a ski or runner 68 is mounted on the center bulkhead 22 by shock absorbers or the like 70. In addition retractable skis or runners may be provided on the wings or the side portions of the fuselage section to give lateral stability.

In planes equipped with either a step or a runner it will be understood that suitable retractable wheels may also be provided to give the plane greater flexibility. It will also be understood that any additional reinforcing may be added as desired in the form of transverse or longitudinal bulkheads or as local reinforcements for mounting engines, landing gear and the like.

While several embodiments of the invention have been illustrated and described in detail it is not intended to limit the scope of the invention to these exact forms nor otherwise than by the terms of the appended claims.

What is claimed is:

1. An aircraft construction comprising hollow wing and fuselage sections having a reinforced skin connected to form a continuous sheet, said wing sections having substantially straight top and bottom walls and said fuselage section having walls substantially straight in a direction transverse to the line of flight and forming the major transverse members for carrying the wing loads.

2. An aircraft construction comprising hollow wing and fuselage sections having a reinforced skin connected to form a continuous sheet, said wing sections having substantially straight top and bottom walls and said fuselage section having walls substantially straight in a direction transverse to the line of flight and forming the major transverse members for carrying the wing loads and bulkheads parallel to the line of flight and secured across said hollow sections at each point where a change of section occurs.

3. An aircraft construction comprising hollow wing and fuselage sections having a reinforced skin connected to form a continuous sheet, said wing sections having substantially straight top and bottom walls and said fuselage section being formed of flat sheets sloping inwardly and downwardly at the lower part and connected to the lower part of the wing sections and the upper part of the fuselage section being formed of substantially flat sheets connected to the upper part of the wing sections, said sheets forming the major transverse members for carrying the wing loads.

4. An aircraft construction comprising hollow wing and fuselage sections having a reinforced skin connected to form a continuous sheet, said wing sections having straight top and bottom walls and said fuselage section being formed of flat sheets sloping inwardly and downwardly at the lower part and connected to the lower part of the wing sections, and the upper part of the fuselage section being formed of flat sheets connected to the upper part of the wing sections, said sheets forming the major transverse members for carrying the wing loads and bulkheads at the juncture of the lower flat sheets and at the points where the wing sections join the fuselage section.

5. An aircraft construction comprising wings connected to a fuselage section formed of sheets substantially straight in a plane transverse to the line of flight but folded about axes at an angle thereto to provide substantially airfoil sections in planes parallel to the line of flight and elongated straight reinforcing members for said sheets extending generally transverse to the line of flight in the direction of load stresses in the sheets, said sheets and reinforcing members carrying the major part of the wing load.

6. An aircraft construction comprising a central fuselage and a pair of outwardly extending wings, said fuselage being relatively wide and tapering outwardly in straight lines from its central portion to its points of connection with the wings so that all changes in section transverse to the line of flight are gradual.

7. In an aircraft construction, a fuselage adapted to be connected to laterally extending wings and formed of connected sheets which are straight in section transverse to the line of flight, said sheets carrying the major part of the wing load and a longitudinal bulkhead in said fuselage connected to said sheets and supporting a major portion of cabin loads in the fuselage.

8. In an aircraft construction, a fuselage section having downwardly converging sides straight in a direction transverse to the line of flight, a central longitudinal truss in said fuselage connected to said sides at the lower portion thereof, wings connected to the sides of the fuselage, said fuselage sides carrying the major part of the wing load, and a landing gear element connected to said truss, said straight sides transmitting the loads on said element directly to the wings.

9. In an aircraft construction, a fuselage section having downwardly converging sides straight in a direction transverse to the line of flight, a central longitudinal truss in said fuselage connected to said sides at the lower portion thereof, wings connected to the sides of the fuselage, said fuselage sides carrying the major part of the wing load, and a nose wheel forming part of a landing gear connected to said truss.

10. In an aircraft construction, a fuselage section having downwardly converging sides straight in a direction transverse to the line of flight, said sides being formed of relatively thin sheets reinforced by straight reinforcing portions, a frame set in one of said sides and formed with a window opening or the like, and means connecting said frame to the sheets and the reinforcing portions completely around its periphery, said sheets and reinforcing portions and said frame carrying the major portion of the wing loads.

11. An aircraft construction comprising laterally extending wings and a fuselage section connecting said wings, said fuselage section comprising sheets substantially straight in planes transverse to the line of flight and curved in vertical planes parallel to the line of flight to form substantially airfoil sections, the major portion of the wing loads being transmitted through said sheets.

12. An aircraft construction comprising laterally extending wings and a fuselage section connecting said wings, said fuselage section comprising sheets straight in planes transverse to the line of flight and curved in vertical planes parallel to the line of flight to form substantially airfoil sections, said sheets on the top and bottom of the fuselage section converging from the central portion of the fuselage to the point of connection with the wings.

13. An aircraft construction comprising laterally extending wings and a fuselage section connecting said wings, said fuselage section comprising sheets straight in planes transverse to the line of flight and curved in vertical planes parallel to the line of flight to form substantially airfoil sections, said sheets connecting to the skin of the wings and diverging therefrom to the central portion of the fuselage to provide a gradual taper from wing to wing transverse to the line of flight.

HENRY A. BERLINER.